(12) United States Patent
Foldesi, Jr.

(10) Patent No.: US 8,101,041 B2
(45) Date of Patent: Jan. 24, 2012

(54) METHOD TO IMPROVE ADHESION OF A FORMED GASKET TO PLASTIC CLOSURES

(75) Inventor: Steve Foldesi, Jr., Hinesburg, VT (US)

(73) Assignee: Nestech Machine Systems, Inc., Hinesburg, VT (US)

( * ) Notice: Subject to any disclaimer, the term of this patent is extended or adjusted under 35 U.S.C. 154(b) by 0 days.

(21) Appl. No.: 12/669,528

(22) PCT Filed: Jul. 28, 2008

(86) PCT No.: PCT/US2008/071369
§ 371 (c)(1),
(2), (4) Date: Jan. 18, 2010

(87) PCT Pub. No.: WO2009/018221
PCT Pub. Date: Feb. 5, 2009

(65) Prior Publication Data
US 2010/0314025 A1 Dec. 16, 2010

Related U.S. Application Data

(60) Provisional application No. 60/952,397, filed on Jul. 27, 2007.

(51) Int. Cl.
*B05D 3/00* (2006.01)
*B65D 41/48* (2006.01)

(52) U.S. Cl. .......... 156/308.4; 156/309.6; 156/309.9; 156/69; 427/316; 427/554; 427/557; 215/341; 215/348

(58) Field of Classification Search .......... 156/242, 156/244.11, 244.25, 308.2, 304.4, 309.9, 156/69, 309.6; 215/232, 233, 341, 347, 348, 215/346; 427/314, 316, 557, 554
See application file for complete search history.

(56) References Cited

U.S. PATENT DOCUMENTS

| | | | |
|---|---|---|---|
| 4,008,354 A * | 2/1977 | Fitchman et al. | 429/56 |
| 4,085,186 A * | 4/1978 | Rainer | 264/268 |
| 4,632,265 A | 12/1986 | Cochrane | |
| 4,957,672 A | 9/1990 | Carter | |
| 5,030,482 A * | 7/1991 | Tadayon | 427/244 |
| 5,749,201 A | 5/1998 | Cochrane | |
| 7,367,465 B2 | 5/2008 | Taber | |
| 2003/0041956 A1* | 3/2003 | Pigott et al. | 156/244.11 |

OTHER PUBLICATIONS

IPEA/416—Notification of Transmittal of International Preliminary Report on Patentability and IPEA/409—International Preliminary Report on Patentability.
ISA/220—Notification of Transmittal or Search Report and Written Opinion of the ISA, or the Declaration and ISA/210—International Search Report.

* cited by examiner

*Primary Examiner* — Katarzyna Wyrozebski Lee
*Assistant Examiner* — Scott W Dodds
(74) *Attorney, Agent, or Firm* — James Marc Leas

(57) ABSTRACT

A method of attaching a gasket to a plastic surface includes providing a plastic material having a surface; applying sufficient heat to the surface to melt the surface while other portions of the plastic material remain solid; providing a liquid gasket material on the heated surface while the heated surface is melted; and allowing the liquid gasket material and the surface to cool so the gasket is welded to the plastic material.

23 Claims, 6 Drawing Sheets

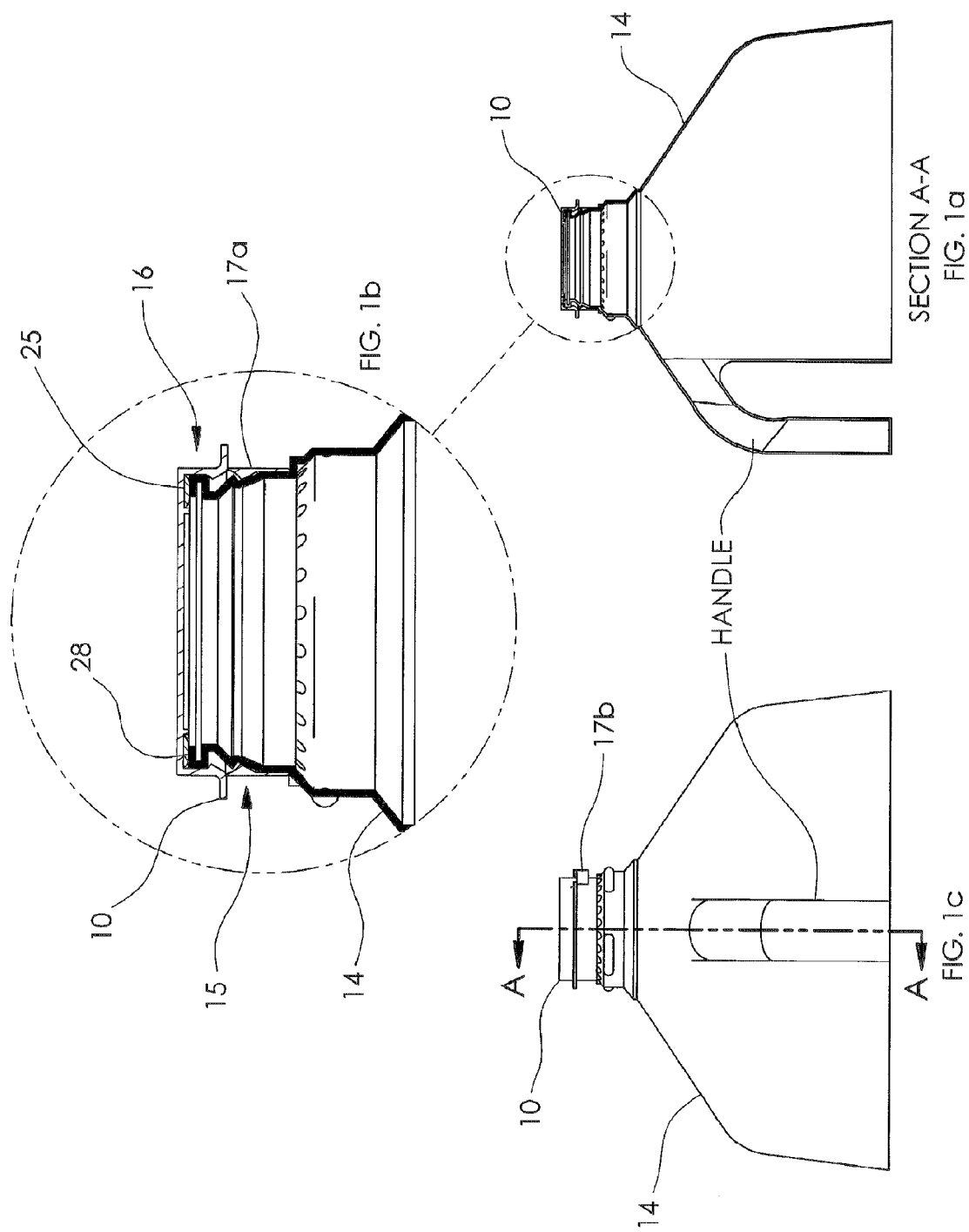

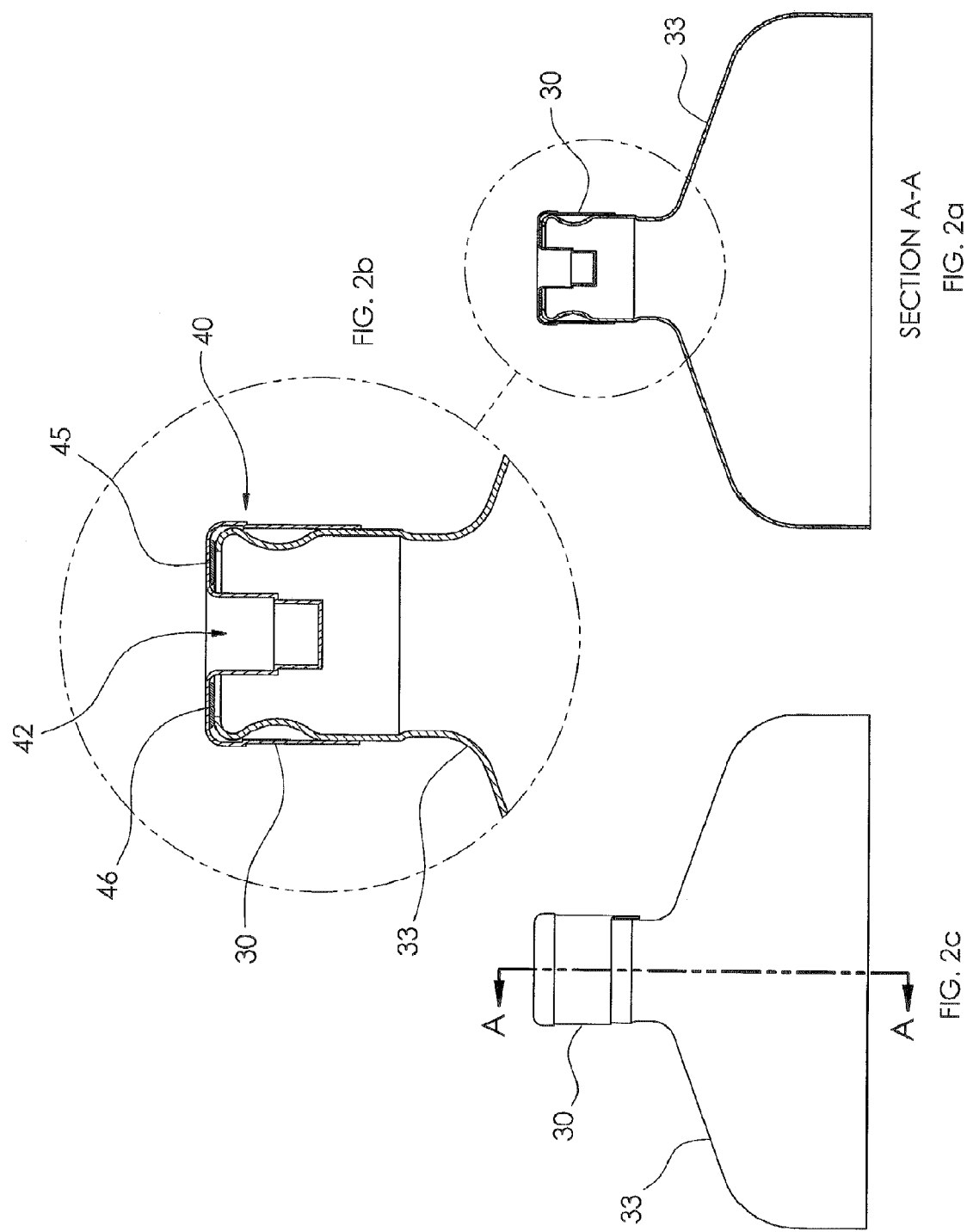

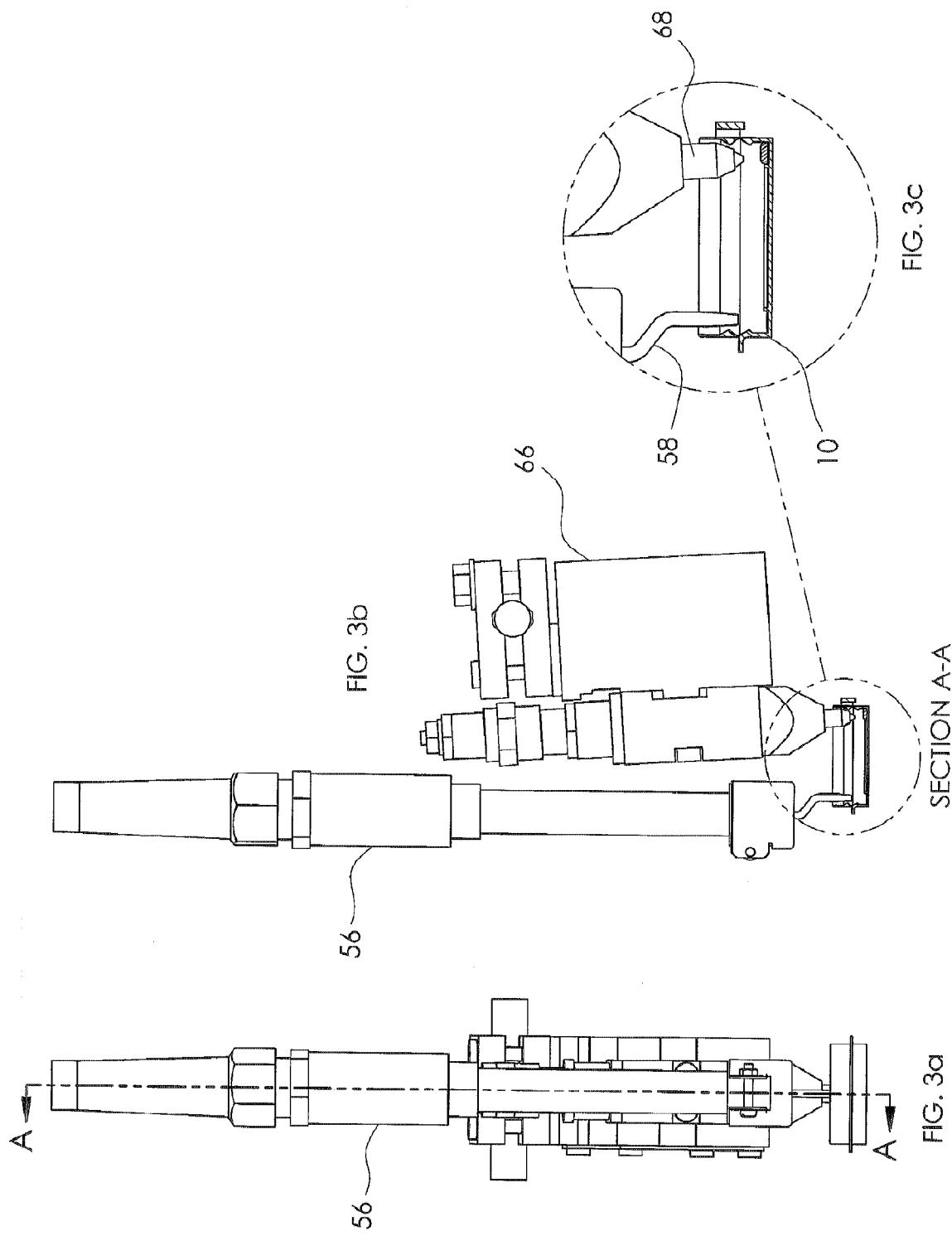

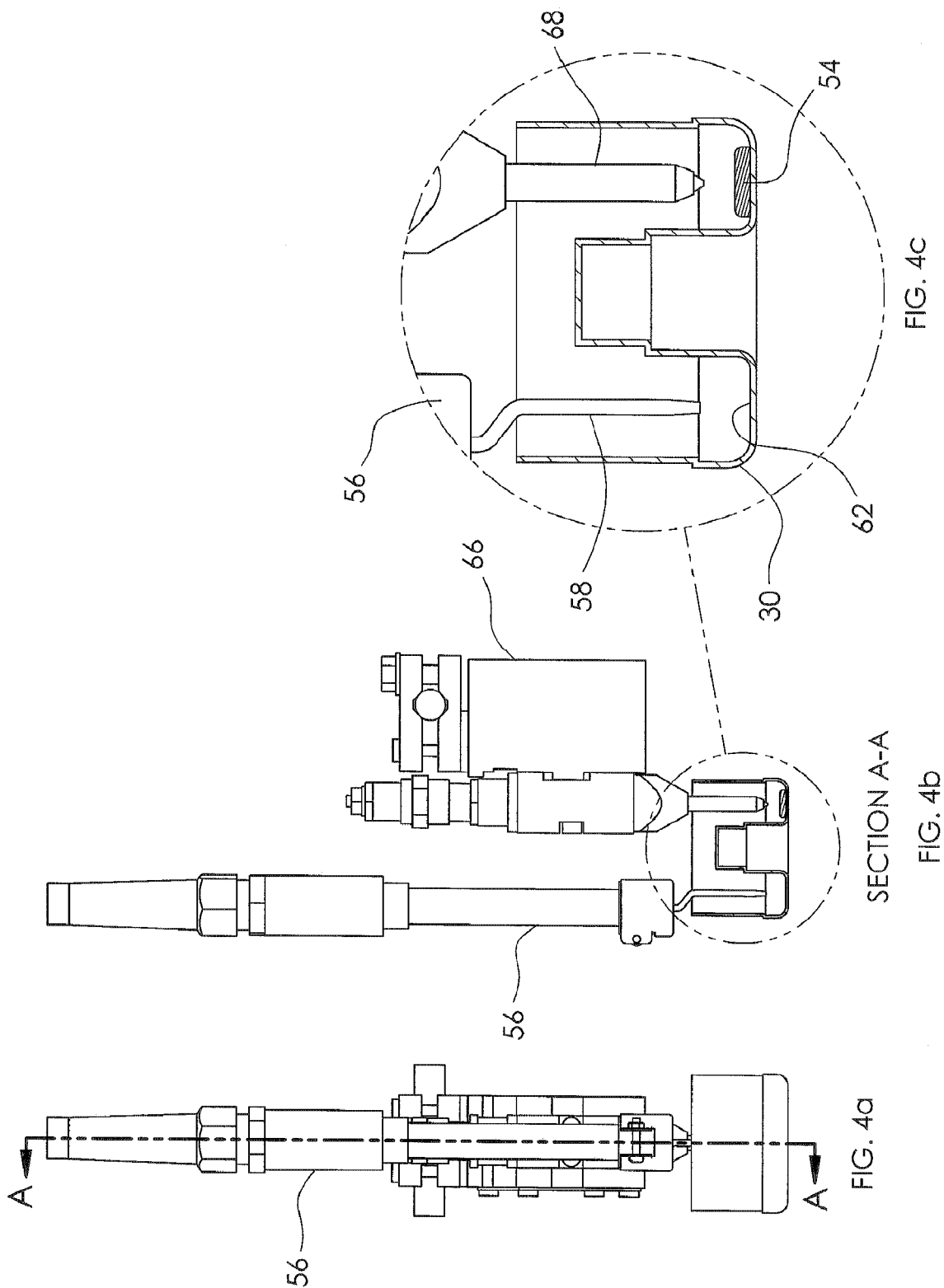

METHOD TO IMPROVE ADHESION OF A FORMED GASKET TO PLASTIC CLOSURES

RELATED APPLICATIONS AND PRIORITY

This application claims priority of PCT/US2008/071369, filed 28 Jul. 2008 which claims priority of Provisional Patent Application 60/952,397, filed 27 Jul. 2007, both of which are incorporated herein by reference.

FIELD

This patent application generally relates to a bond between plastic closures and sealing gaskets. More particularly, it relates to a system for improving bonding between plastic of the closure and the gasket.

BACKGROUND

Synthetic rubber compounds have been used to form a gasket inside a plastic closure for a container. The gasket has improved the seal between the closure and the container. The seal has been used to prevent leakage of the product out of the container and to prevent contamination of the product from outside air coming into the container.

The synthetic rubber compounds have been heated to a predetermined melting temperature before applying the molten synthetic rubber to the closure. In some prior systems the synthetic rubber has been mixed with an inert gas, such as nitrogen, to form a foamed gasket upon application to the closure. A Nordson Foam Melt model No. FM200 is an example of such a synthetic rubber and nitrogen gas applicator.

One suitable synthetic rubber compound that has been used is Foremelt 517/C, available from Foreco srl. (Marcallo Con Casone, Italy). Foremelt 517/C has a suggested application temperature of 175-180° Celsius.

The application has typically involved rotating the closure around a stationary applicator gun. The liquid synthetic rubber compound is applied from the gun to the closure. The closure is usually close to room temperature (20° C.) while the liquid synthetic rubber compound is applied. The synthetic rubber compound material may include a gas, such as nitrogen, to cause it to later become a foam. Because the closure is rotating during application of the liquid melted synthetic rubber compound, a ring shaped bead of foamed gasket forms all around the inside of the closure. Since the Foremelt 517/C is cold curing no further curing steps have been required, such as with a heated oven or microwave type oven. The closure with its gasket has then been applied to the container with the gasket providing the seal between closure and container.

However, product leakage has often been caused by inadequate bonding of the gasket to the closure. For food and beverage items, a gasket that separates from the closure after opening has not been acceptable. In some cases the gasket has fallen back into the container. In larger water cooler bottles gaskets with poor adhesion have shifted to one side allowing for leakage. In pressurized products, such as carbonated beverages, the pressurized gas has crept between the gasket and closure causing further gasket separation, escape of gas, and product spoilage. Thus, further improvement has been desired to more securely bond the gasket to the closure, and this solution is provided by the following.

SUMMARY

One aspect of the present patent application is a method of attaching a gasket to a plastic surface. The method includes providing a plastic material having a surface; applying sufficient heat to the surface to melt the surface while other portions of the plastic material remain solid; providing a liquid gasket material on the heated surface while the heated surface is melted; and allowing the liquid gasket material and the surface to cool so the gasket is welded to the plastic material.

Another aspect of the present patent application is a method of attaching a gasket to a plastic surface. The method includes providing a plastic material having a surface; applying sufficient heat to the surface to melt the surface while other portions of the plastic material remain solid, wherein the applying heat involves applying at least one from the group consisting of hot air, heat lamp, laser, and flame; providing a liquid gasket material on the heated surface while the heated surface is melted; rotating the plastic material while applying the heat to the surface and while providing the liquid gasket material; and allowing the liquid gasket material and the surface to cool so the gasket is welded to the plastic material.

Another aspect of the present patent application is a method of attaching a gasket to a plastic surface. The method includes providing a plastic material having a surface, wherein the plastic material is part of a closure, wherein the closure has a ring shaped planar surface; applying sufficient heat to the surface to melt the surface while other portions of the plastic material remain solid, wherein the heat is applied exclusively to the ring shaped planar surface; providing a liquid gasket material on the heated surface while the heated surface is melted; allowing the liquid gasket material and the surface to cool so the gasket is welded to the plastic material; and providing a container and placing the closure on the container, wherein the gasket provides sealing between the closure and the container.

BRIEF DESCRIPTION OF THE DRAWINGS

FIG. 1a is a cross sectional view of a snap on closure latched to a one gallon plastic milk container with a gasket of the present patent application there between;

FIG. 1b is an enlarged cross sectional view of a portion of FIG. 1a;

FIG. 1c is a side view of the closure and milk container of FIG. 1a;

FIG. 2a is a cross sectional view of a friction fit closure latched to a 5 gallon water bottle of a water cooler with a gasket of the present patent application there between;

FIG. 2b is an enlarged cross sectional view of a portion of FIG. 2a;

FIG. 2c is a side view of the closure and 5 gallon water bottle of FIG. 2a;

FIG. 3a is a side view of a hot air gun heating and applying liquid synthetic rubber compound to a one gallon milk container closure;

FIG. 3b is a cross sectional view of the hot air gun and milk container closure of FIG. 3a;

FIG. 3c is an enlarged cross sectional view of a portion of FIG. 3b showing the hot air nozzle applying hot air and the synthetic rubber applicator gun nozzle applying liquid synthetic rubber to the one gallon milk container closure;

FIG. 4a is a side view of a hot air gun heating and applying liquid synthetic rubber compound to a 5 gallon water bottle closure;

FIG. 4b is a cross sectional view of the hot air gun and 5 gallon water bottle closure of FIG. 4a;

FIG. 4c is an enlarged cross sectional view of a portion of FIG. 4b showing the hot air nozzle heating and the synthetic rubber applicator gun nozzle applying liquid synthetic rubber to the 5 gallon water bottle closure;

DETAILED DESCRIPTION

Figures 3D, 3E:
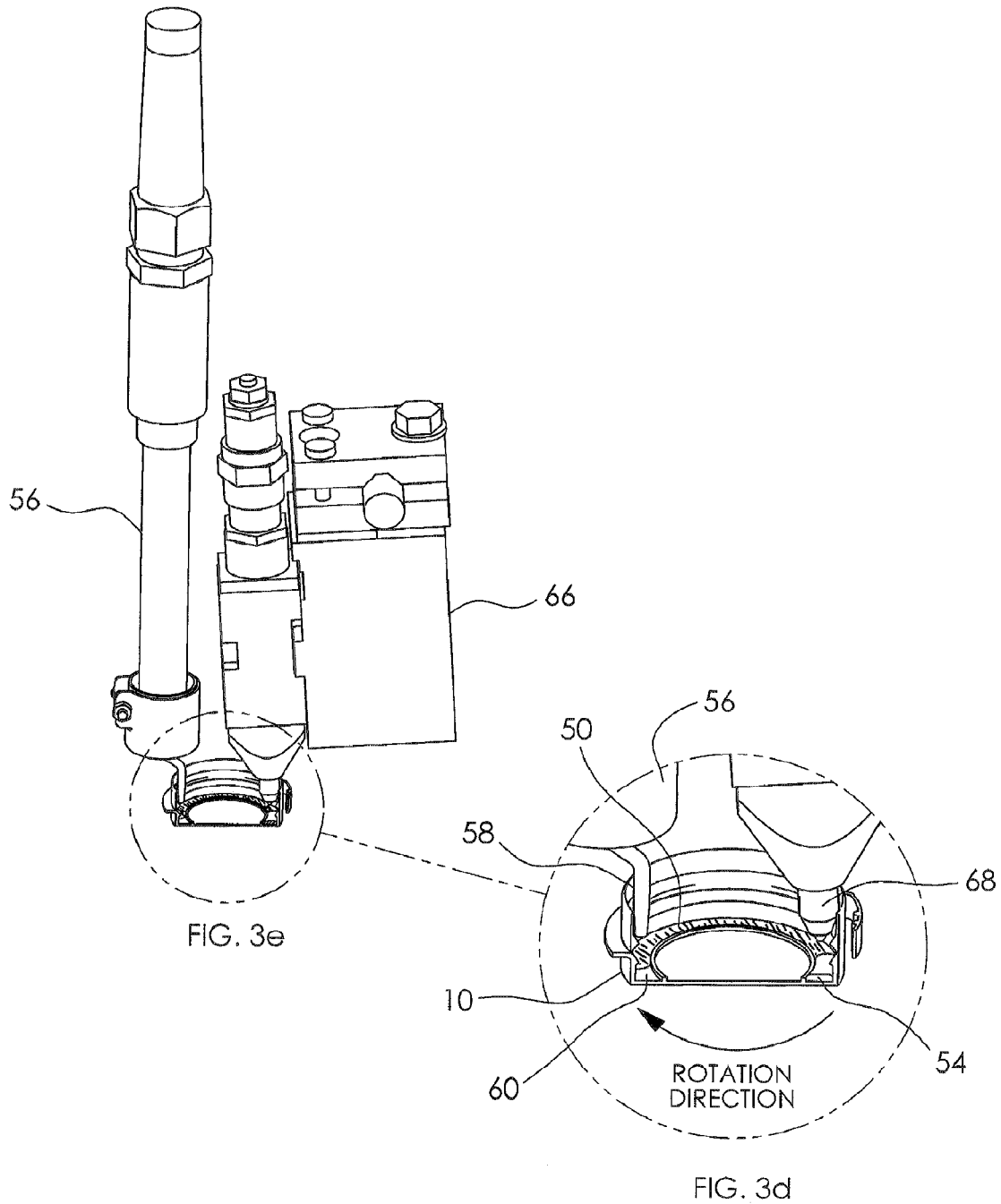
FIG. 3d is an enlarged cross sectional view of a portion of FIG. 3e showing the hot air nozzle melting the surface of the one gallon milk container closure and the synthetic rubber applicator gun nozzle applying liquid gasket compound.
FIG. 3e is a three dimensional view of a hot air gun heating and applying synthetic rubber compound to the one gallon milk container closure.

The present applicant found that he could obtain substantially improved adhesion of the synthetic rubber gasket to the closure if he melted the surface of the closure in the contact region just before the liquid synthetic rubber compound was applied. One way he found to satisfactorily melt the surface of the closure in that region was with a hot air gun. He found that the bond between the synthetic rubber gasket and the closure was stronger than the bond holding together the synthetic rubber itself.

In one use of the present patent application, snap on closure 10 is latched to plastic milk container 14 with lower retaining ring 15 and upper retaining ring 16, as shown in FIGS. 1a, 1b. Snap on closure 10 includes peel off portion 17a that is removed by pulling on tab 17b, as shown in FIGS. 1b and 1c. Snap on closure 10 also includes gasket 25 of the present patent application that is firmly bonded to snap on closure 10 and that seals against rim 28 of plastic milk container 14 when snap on closure 10 is snapped on to plastic milk container 14.

In another use of the present patent application, friction fit closure 30 is latched to five gallon plastic water bottle 33 with retaining ring 40, as shown in FIG. 2b. Friction fit closure 30 includes valve 42 that fits to a stem on a water cooler for delivering water. Friction fit closure 30 also includes gasket 45 of the present patent application that is firmly bonded to friction fit closure 30 and that seals against rim 46 of five gallon plastic water bottle 33 when friction fit closure 30 is latched on to five gallon plastic water bottle 33.

Figures 4D, 4E:
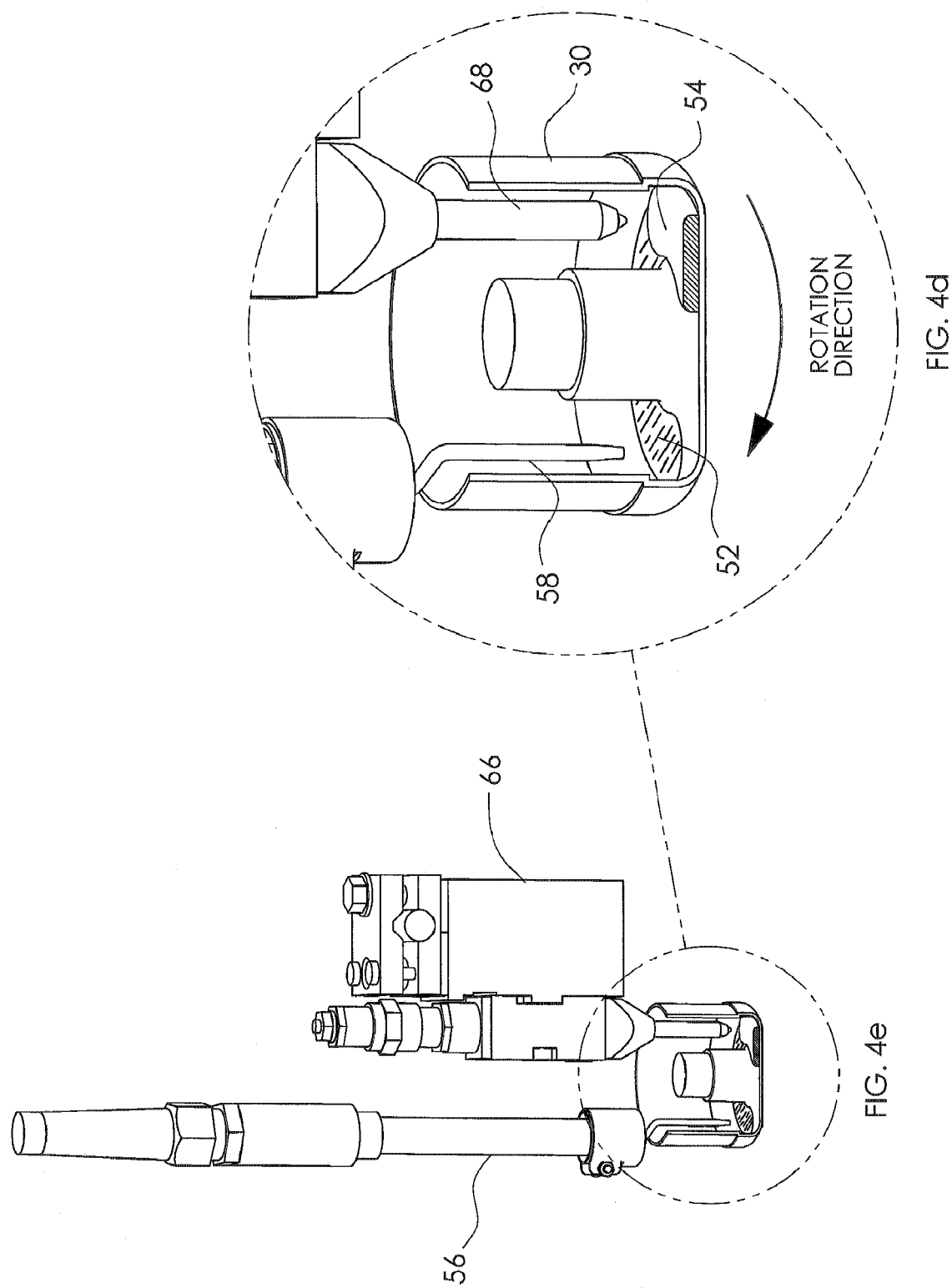
FIG. 4d is an enlarged cross sectional view of a portion of FIG. 4e showing the hot air nozzle melting the surface of the 5 gallon water bottle closure and the synthetic rubber applicator gun nozzle applying liquid gasket compound.
FIG. 4e is a three dimensional view of a hot air gun heating and applying synthetic rubber compound to the 5 gallon water bottle closure.

In one experiment, hot air was applied to form melted surface 50, 52 of plastic closure 10, 30 immediately before application of synthetic rubber compound 54 came from hot air tool 56 from Leister Process Technologies (Sarnen, Switzerland), model No. LE Mini 400, as shown in FIGS. 3a-3e and FIGS. 4a-4e. The present applicant found that by placing hot air nozzle 58 in close proximity to sealing surface 60, 62 of closure 10, 30 hot air from gun 56 formed melted plastic surface 50, 52 to achieve a "wet" look. Before melted plastic surface 50, 52 cooled or resolidified, the applicant applied molten synthetic rubber compound 54 from applicator gun 66 through nozzle 68. Because melted plastic surface 50, 52 and applied compound 54 were both in a molten state at the same time the resulting gasket 25, 45 was welded to plastic closure 10, 30. Mixing of melted plastic surface 50, 52 with synthetic rubber compound 54 at their interface bonded them based on intermixing of the two materials at the interface, sometimes called an inter-dissolution bond, providing a much stronger bond than was achieved by just adhering compound 54 to the cold plastic closure.

Testing demonstrated that the gasket provided with the hot air surface treatment was virtually destroyed when applicant attempted to remove the gasket. Without hot air surface treatment the gaskets easily peels away intact from the plastic closure using, for example, a dental pick tool. Thus, the hot air surface treatment of the closure provided a much stronger bond.

Because sealing surface 60, 62, of plastic closure 10, 30 was melted before application of molten synthetic rubber compound 54, all portions of compound 54 contacting melted plastic surface 50, 52 of plastic closure 10, 30 were welded to melted plastic surface 50, 52 of plastic closure 10, 30.

In addition to hot air, flaming, a heat lamp, a laser, or other methods can be used to melt sealing surface 60, 62 of plastic closure 10, 30 while leaving other portions of plastic closure 10, 30 cool to provide similar results.

Plastic closure 10, 30 can be any kind of cap or lid. The closure can be a snap-on type, a friction-fit type, or a screw-on type for milk containers, water bottles, or any other kind of container or bottle. This hot air concept can also be used on virtually any plastic substrate requiring an improved gasket bond. The gasket need not be round; it can be square, oval, or any other shape. In this case it may be desirable to move the applicator gun and the heat gun instead of rotating the closure.

Other compound formulations having similar properties as the Foremelt product can also be used. The gasket can also be formed of starch based material, a hot melt closure sealing compound, or any other material that melts.

The present applicants found that with hot air heating only the surface heated and melted to provide a wet look, and other portions of the plastic closure did not melt. The exclusively surface heating allowed the closure to retain its original shape after the heating process was complete. No deformation of the closure was observed as a result of this air heating process.

While several embodiments, together with modifications thereof, have been described in detail herein and illustrated in the accompanying drawings, it will be evident that various further modifications are possible without departing from the scope of the invention as defined in the appended claims. Nothing in the above specification is intended to limit the invention more narrowly than the appended claims. The examples given are intended only to be illustrative rather than exclusive.

The invention claimed is:

1. A method of attaching a gasket to a plastic surface; comprising:
   a. providing a plastic material having a surface, wherein said plastic material is part of a closure, wherein said closure has a ring shaped planar surface;
   b. applying sufficient heat to said surface to melt said surface while other portions of said plastic material remain solid, wherein said heat is applied exclusively to said ring shaped planar surface;
   c. providing a liquid gasket material on said heated surface while said heated surface is melted; and
   d. allowing said liquid gasket material and said surface to cool so said gasket is welded to said plastic material.

2. A method as recited in claim 1, wherein other portions of said plastic material remain unheated.

3. A method as recited in claim 1, wherein said other portions of said plastic material have a shape before heating, wherein said other portions of plastic material have said shape after said heating.

4. A method as recited in claim 1, wherein all portions of said gasket material contacting said plastic material are welded to said plastic material.

5. A method as recited in claim 1, further comprising rotating said plastic material while applying said heat to said surface and while providing said liquid gasket material.

6. A method as recited in claim 1, wherein said applying heat provides a wet look to said plastic material.

7. A method as recited in claim 1, wherein said applying heat involves applying hot air.

8. A method as recited in claim 1, wherein said applying heat involves applying at least one from the group consisting of heat lamp, laser, and flame.

9. A method as recited in claim 1, wherein said plastic material is part of a closure, further comprising (e) placing said closure on a container wherein said gasket provides sealing between said closure and said container.

10. A method as recited in claim 1, wherein said liquid gasket material includes synthetic rubber.

11. A method as recited in claim 1, wherein said liquid gasket material includes starch based material.

12. A method as recited in claim 1, wherein said liquid gasket material includes a hot melt closure sealing compound.

13. A method as recited in claim 1, wherein said liquid gasket material includes a gas.

14. A method as recited in claim 13, further comprising forming a foam gasket from said gasket material and said gas.

15. A method as recited in claim 1, wherein said applying heat involves applying at least one from the group consisting of hot air, heat lamp, laser, and flame and rotating said plastic material while applying said heat to said surface and while providing said liquid gasket material.

16. A method as recited in claim 15, wherein said applying heat involves applying hot air.

17. A method as recited in claim 1, wherein said plastic material is part of a closure, wherein said closure has a ring shaped planar surface, wherein said heat is applied exclusively to said ring shaped planar surface, and providing a container and placing said closure on said container, wherein said gasket provides sealing between said closure and said container.

18. A method as recited in claim 17, wherein said other portions of said plastic material have a shape before heating, wherein said other portions of plastic material have said shape after said heating.

19. A method as recited in claim 17, further comprising rotating said plastic material while applying said heat to said surface and while providing said liquid gasket material.

20. A method as recited in claim 17, wherein said applying heat involves applying at least one from the group consisting of applying hot air, heat lamp, laser, and flame.

21. A method as recited in claim 17, wherein said applying heat involves applying hot air.

22. A method as recited in claim 17, wherein said liquid gasket material includes a gas.

23. A method as recited in claim 22, further comprising forming a foam gasket from said gasket material and said gas.

* * * * *